Aug. 10, 1948.
G. HERZOG ET AL
2,446,588
METHOD OF DETERMINING THE
PERMEABILITY OF SUBSTRATA
Filed April 4, 1944
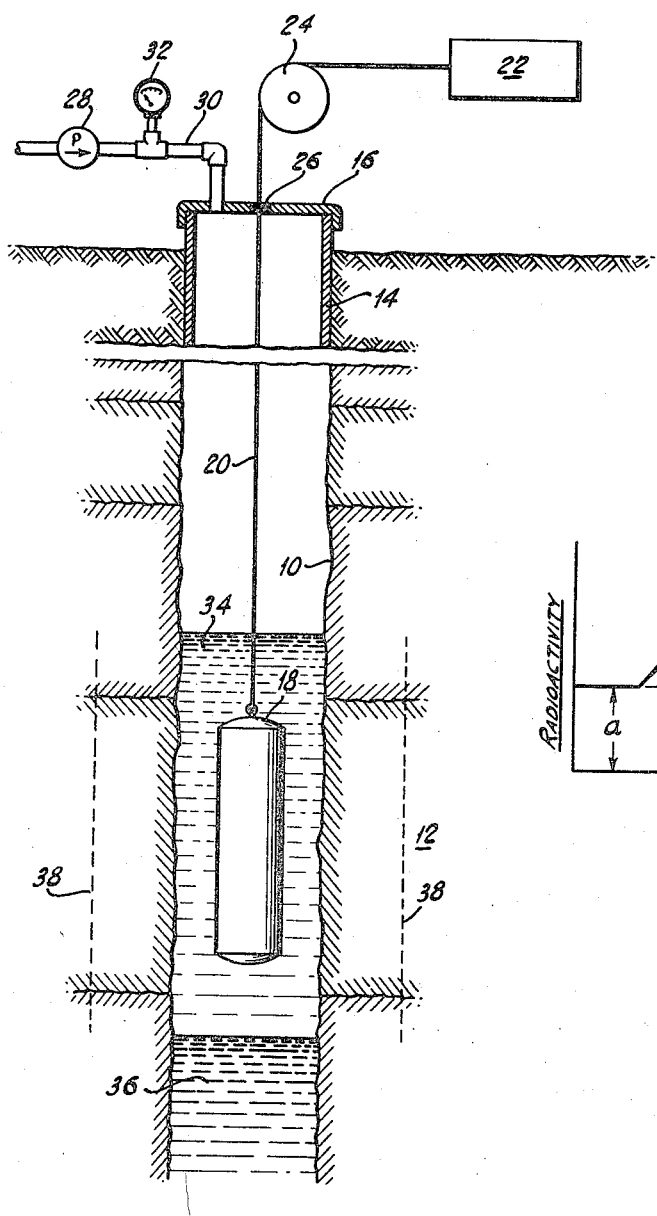
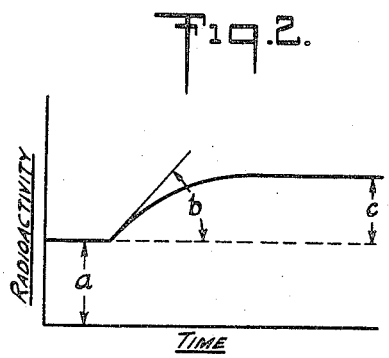
INVENTORS
GERHARD HERZOG.
ALEXANDER WOLF.
BY
ATTORNEY Patented Aug. 10, 1948

2,446,588

UNITED STATES PATENT OFFICE 2,446,588

METHOD OF DETERMINING THE PERMEABILITY OF SUBSTRATA

Gerhard Herzog and Alexander Wolf, Houston, Tex., assignors to The Texas Company, New York, N. Y., a corporation of Delaware Application April 4, 1944, Serial No. 529,487

7 Claims. (Cl. 250—83)

This invention relates to the determination of the nature of substrata and more particularly to a method of determining or measuring the permeability or the porosity, or both, of an underground formation.

The determination of the permeability and porosity of formations surrounding a bore hole or a well is becoming increasingly important to those engaged in the prospecting for, or the locating of, oil deposits and in the producing of oil from such deposits. The term "permeability" or more strictly "normal permeability" refers to a property of the rock or formation itself and is determined by measuring the resistance offered to the flow of a fluid through the formation under conditions of viscous flow. The permeability of rocks which may contain oil has been found to vary from almost zero to as high as 25 darcys. Generally speaking, cores of producing sands may show permeability ranging between 50 and 2000 millidarcys.

The effective porosity of a rock or formation is the ratio of the volume of interconnected pore space to the total bulk volume of the rock expressed as a percentage. The porosity of a rock may vary from almost zero to as high as 60%, with most oil bearing rocks having porosities between 10 and 40%.

It is well known that oil deposits commonly occur in the vicinity of highly porous structures or formations, but, aside from the obvious desirability of locating these structures in the search for oil, the permeability and porosity of the formations are important in other considerations. Thus, in designing equipment to be used in connection with oil producing, the size and nature of desalting and dehydrating equipment, the size of pumps required where water drive is used to force oil through the pore spaces into the well, etc. may depend to a large extent on the porosity and the permeability of the producing formation.

Porosity and permeability measurements have been made by studying core samples obtained either during the drilling of the well or afterwards by means of suitable coring equipment. The obtaining and analyzing of core samples are time consuming operations and the accuracy of results obtained usually is proportional to the number of cores taken. Among other prior methods of measuring permeability and porosity are those involving electrical measurements of potentials created by liquid infiltration through porous media. In making these measurements much care must be exercised, polarization of the measuring electrodes must be eliminated or accounted for, and errors caused by electrochemical action are not uncommon.

In accordance with the present invention a bore hole, or that portion of a bore hole opposite a formation to be examined, is filled with a fluid containing a substance which is either naturally or artifically radioactive. A radiation detecting device suspended from a cable is lowered through the hole to a point opposite the formation to be studied, and pressure is then applied to the liquid. If the formation is porous to any appreciable extent some of the liquid containing the radioactive substance will be forced into the pore spaces of the formation and if the pressure on the liquid is maintained constant, the rate of flow of the liquid into the formation and the attendant increase in radioactivity of the formation will be indicative of the permeability of that formation. By means of the radiation detector in the hole connected to an indicating or recording device at the surface measurements are made of the radioactivity during the period when the liquid is passing into the pore spaces of the formation. As before stated the rate of increase in the radioactivity of the formation will be indicative of the formation's permeability. After a time, depending of course upon the pressure exerted and the permeability and porosity of the formation, the increase in radioactivity will cease. The total amount, or rather the amount of increase in radioactivity in the formation due to the forcing into the pore spaces of the radioactive liquid, will provide an indication of the porosity of the formation.

For a better understanding of the invention reference may be had to the accompanying drawing in which:

Figure 1 is a vertical elevation through a portion of a bore hole or well showing an apparatus for measuring the radioactivity of a formation into the pore spaces of which a radioactive liquid is being forced; and Figure 2 is a curve showing the increase of radioactivity of a formation with respect to time.

In Figure 1 of the drawing a bore hole 10 is shown as having been drilled through various formations or strata, including the formation 12, the permeability and porosity of which it is desired to determine. A casing 14 is shown in the upper portion of the hole and is provided with a suitable casing head 16. Within the hole 10 and at a depth such as to be opposite a portion of formation 12, is a radiation detector 18, the output or response of which passes through the suspending cable 20 to a suitable indicating or recording device 22 at the surface. The cable 20 is shown as passing over the pulley or drum of a device 24 by means of which the depth or position of the detector 18 in the hole can be measured. Preferably, the cable 20 passes through a resilient packing or gland 26 in the casing head 16. A pump or compressor 28 is connected to the interior of the well by means of a pipe 30 to which is attached a suitable pressure gauge 32. If the formation 12 to be studied is at the bottom or near the bottom of the hole, a liquid 34 containing a radioactive substance either in solution or suspension is placed in the hole and a sufficient amount is used to reach a level at an appreciable distance above the top of the radiation detector 18. In case the formation 12 is at some considerable distance above the bottom of the hole, a liquid or solution such as drilling mud 36 may be placed in the lower portion of the hole and a lighter liquid containing the radioactive substance then placed on top of the lower liquid.

After the liquid 34 is in position, pressure is applied to the well by means of the pump 28 and the pressure is preferably maintained at a constant value by observation of the meter 32. Before starting the pump 28, the radiation detector 18 is connected and the instrument 22 will indicate or record the natural radioactivity of the formation 12 plus a constant amount of radioactivity caused by the liquid 34 surrounding the detector. This response or output of the detector is indicated in the curve of Figure 2 at $a$ and should be substantially constant up until the time the pressure is applied to the liquid by means of the pump 28. At that point some of the liquid 34 containing the radioactive substance will begin to enter the pore spaces of the formation 12 and the response of the detector will indicate an increase in radioactivity, the rate of which will depend upon the permeability of the formation and the amount of pressure applied to the liquid. In Figure 2 the angle $b$ which is the initial slope of the curve indicates the permeability of the formation. The pressure on the liquid 34 is maintained constant until no further increase in radioactivity is noted.

The gamma radiation from the radioactive liquid 34 has a limited penetration indicated by the dotted lines 38 which represent a cylinder surrounding the bore hole. The diameter of this cylinder will depend upon the maximum penetration of the radiation, and, when the pore spaces of that portion of the formation within the cylinder are full of the liquid 34, the curve of Figure 2 will have reached a horizontal position. The total increase in radioactivity of the formation after the pressure is applied to the liquid 34 is represented by the distance $c$ in Figure 2 and is indicative of the porosity of the formation. In determining the permeability and porosity from the curve of Figure 2, the intensity of radiation from the liquid 34 must of course be borne in mind as well as the amount of pressure applied to the liquid.

As hereinbefore stated, it is desirable that the liquid 34 extend for some distance both above and below the detector 18. The detector is of course responsive to the radiation of the liquid 34 for a certain distance above the detector and if the level of the liquid should be lowered below this distance, due to the pressure applied to its upper surface and a high porosity of the formation 12, an error in the response of the detector would probably result.

The liquid 34, as previously mentioned, may contain the radioactive substance either in suspension or in solution. Carnotite is an example of a substance which may be contained in suspension in a liquid such as water. As examples of naturally radioactive substances, capable of being dissolved in water the following are mentioned: Radon, radium bromide, radium chloride, uranium bromide, uranium tetrabromide, thorium bromide, thorium iodide, and thorium nitrate. As a radioactive substance soluble in oil, radium naphthenate would be satisfactory. These materials are mentioned by way of example and it is to be understood that any other substance may be used which is radioactive and which can be placed in solution or in suspension in a suitable liquid such as, for instance, water or oil.

Although the substances mentioned in the foregoing paragraph are naturally radioactive, it is also to be understood that artificially produced radioactive substances may be used. The U. S. Letters Patent No. 2,206,634 to Fermi et al., granted July 2, 1940, mentions several substances which may be made artificially radioactive and still other substances which may be made radioactive by any methods other than those disclosed in the Fermi et al. patent may be used.

Although the bore hole opposite the formation 12 is shown as uncased, the method of the invention also may be used in a cased hole, it merely being necessary to suitably perforate the portion of the casing opposite the formation where the tests are to be made so that the radioactive liquid can flow through the perforations and be forced into the pore spaces of the surrounding formation.

The detector 18 may be any suitable device responsive to radiation produced by the radioactive liquid 34; thus, a Geiger-Müller counter, an ionization chamber, or proportional counter will be suitable. Naturally, the more sensitive the radiation detector, the more effective will be the method of the invention.

Obviously many modifications and variations of the invention, as hereinbefore set forth, may be made without departing from the spirit and scope thereof, but only such limitations should be imposed as are indicated in the appended claims.

We claim:

1. A method of determining the permeability of an earth stratum which comprises forcing a fluid containing a radioactive substance into the pore spaces of the stratum and measuring the rate of change in radioactivity of the stratum.

2. A method of determining the permeability of an underground formation traversed by a bore hole which comprises forcing a radioactive substance into the pore spaces of the formation while simultaneously therewith measuring the resulting increase in the radioactivity of the formation with respect to time.

3. A method of determining the permeability of an underground formation traversed by a bore hole which comprises placing a liquid containing a radioactive substance in said bore hole, applying pressure to said liquid to force a portion of the liquid into the pore spaces of the formation, maintaining said pressure at a constant value and measuring the increase in radioactivity of the formation with relation to the time said pressure is applied.

4. A method of determining the permeability of an underground formation traversed by a bore hole which comprises placing a liquid containing a radioactive substance in said bore hole, applying pressure to said liquid whereby a portion of the liquid passes into the pore spaces of the formation at a rate depending upon the permeability of the formation and the amount of pressure applied, and measuring the rate of increase in radioactivity of the formation with respect to the amount of pressure and the time the pressure is applied.

5. A method of determining the permeability and porosity of an underground formation penetrated by a bore hole which comprises placing a radioactive liquid in that portion of the hole which is in the vicinity of said formation, applying pressure to force some of the liquid into the pore spaces of the formation, measuring the rate of increase in the radioactivity of the formation, continuing the application of pressure until no further increase in radioactivity is noted and measuring the total increase in the radioactivity of the formation, the rate and the amount of increase in radioactivity being indicative respectively of the permeability and the porosity of the formation.

6. A method of determining the permeability and porosity of an underground formation penetrated by a bore hole which comprises placing an aqueous solution of radium chloride in that portion of the hole which is in the vicinity of said formation, applying a predetermined pressure to force some of said solution into the pore spaces of the formation, measuring the rate of increase in the radioactivity of the formation, continuing the application of pressure until no further increase in radioactivity is noted and measuring the total increase in the radioactivity of the formation, the rate of increase being indicative of the permeability of the formation and the amount of increase being indicative of the porosity of the formation.

7. A method of determining the permeability and porosity of an underground formation penetrated by a bore hole which comprises placing an artificially radioactive fluid in that portion of the hole which is in the vicinity of said formation, applying a constant pressure to force some of the liquid into the pore spaces of the formation, measuring the rate of increase in the radioactivity of the formation, continuing the application of said constant pressure until no further increase in radioactivity is noted and measuring the total increase in the radioactivity of the formation, the rate of increase being indicative of the permeability of the formation and the total amount of increase being indicative of the porosity of the formation.

GERHARD HERZOG.
ALEXANDER WOLF.

REFERENCES CITED

The following references are of record in the file of this patent:

UNITED STATES PATENTS

| Number | Name | Date |
| --- | --- | --- |
| 2,352,993 | Albertson | July 4, 1944 |
| 2,358,945 | Teichmann | Sept. 26, 1944 |
| 2,385,378 | Piety | Sept. 25, 1945 |